Patented Feb. 7, 1939

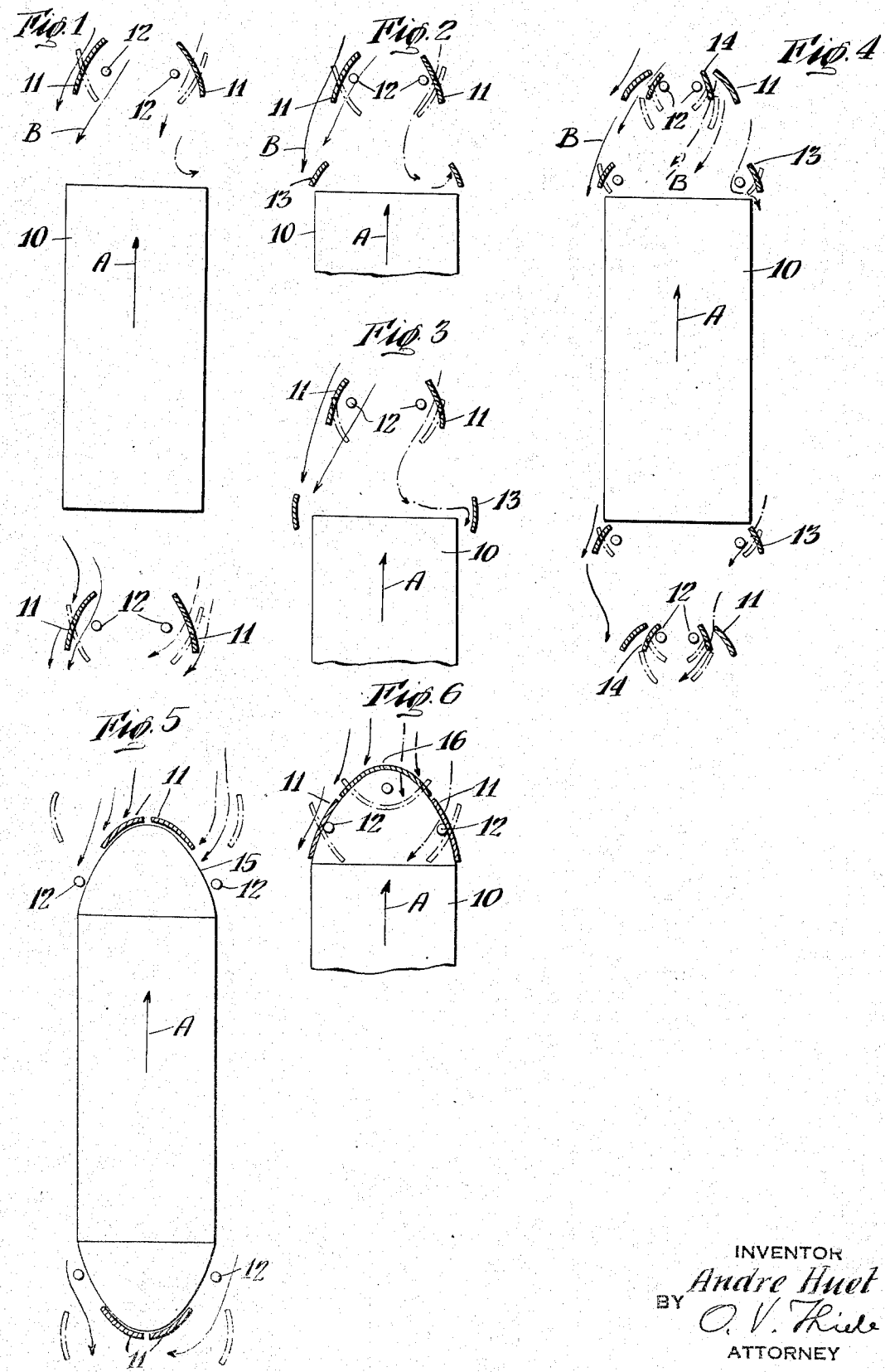

2,146,297

UNITED STATES PATENT OFFICE 2,146,297

WIND DEFLECTOR AND BRAKE

André Huet, Paris, France

Application August 26, 1937, Serial No. 161,012
In Belgium September 2, 1936

4 Claims. (Cl. 188—87)

The present invention relates generally to apparatus for reducing the resistance opposed by wind currents to the movement of a body such as an automobile, a locomotive, train, or the like.

The apparatus of the present invention comprises deflecting plates arranged to divert the wind currents so as to reduce the resistance opposed thereby to the movement of the body but which are movably mounted so that they may also be adjusted with respect to each other, or the surfaces of the body, so as to provide a braking effect on the movement of the body. The braking effect is obtained by adjusting the deflecting plates either to increase the cross-section of the body presented to the wind currents or to position the plates so that the wind currents react upon them and/or on the surfaces of the body so as to increase the wind resistance to movement that is occasioned by the wind.

In a simple form the apparatus comprises a pair of plates mounted in laterally spaced relation at the front of the body and inclined with respect to its longitudinal axis so as to deflect the wind currents outwardly away from the front end of the body to prevent it striking the latter. These plates are movably mounted so that by changing their inclination with respect to the wind currents they may modify its effect on the body even to the extent of increasing the wind resistance to its forward movement.

The deflectors which function as described above, may be of the forms described in my co-pending applications, Serial No. 757,026, filed December 11, 1934, now Patent 2,122,422 issued July 5, 1938, or 86,714, filed June 23, 1936. These deflectors may be placed at the front of the body and/or at its rear, along its sides or at various other suitable locations. For the purpose of varying their effect upon the wind currents they may, for example, be supported for pivotal movement about suitable axes of rotation.

The invention may be also embodied in vehicles which are streamlined in the sense that their exterior contours are faired so as to decrease wind resistance. To provide for increasing wind resistance to produce a braking effect in accordance with the invention, the streamlined surfaces of the body may include plates which are movably mounted so that they may be adjusted to present surfaces thereof to the wind currents in such manner as to increase the resistance to the movement of the body.

The adjustment of the deflecting devices to braking positions may be carried out in conjunction with the operation of the usual brakes on a vehicle. For example, the deflecting devices of the present invention may be operated to produce a braking effect for checking the movement of the vehicle when operating at high speeds and the ordinary brakes applied when the speed has been reduced or the two forms of braking devices may function alternately or simultaneously.

The present invention will be best understood upon consideration of the following detailed description and appended claims when read in conjunction with the accompanying drawing in which:

Fig. 1 diagrammatically represents a moving body provided at its front end with a single pair of deflecting plates for reducing wind resistance and also arranged to produce a braking action.

Figs. 2 and 3 represent bodies provided with an additional pair of deflecting plates adjacent their front ends for maintaining the currents deflected by the forward plates in their courses until they pass the front end of the body.

Fig. 4 represents another arrangement of deflecting plates; and

Figs. 5 and 6 illustrate the application of the invention to a vehicle which has a streamlined contour.

In Fig. 1 the moving body is represented by the rectangle designated by the numeral 10 and moves in the direction of the arrow A. At a point forwardly of the front end of the body 10 a pair of substantially vertically extending plates are mounted in laterally spaced relation and inclined outwardly and rearwardly with respect to the longitudinal axis of the body. Wind currents encountered by the body 10 in its movement are deflected laterally as indicated by the arrows B out of the path of movement of the body so as to decrease the resistance opposed by the wind to its forward movement. Part of the air currents pass between the two deflectors 11 and in traversing the rearwardly diverging passage resulting from their rearward and outward inclination, the velocity of the air currents is reduced with resulting increase in static pressure. Consequently a body of air is formed forwardly of the front end of the vehicle which is at a higher static pressure than the passing wind currents and acts to prevent their entering the space between the rear sides of the deflectors 11 and the front end of the vehicle. This type of deflecting device and its operation is more fully described in my Patent 2,122,422 above noted.

The plates 11 are mounted to rotate about axes 12 so that they may be adjusted to positions, as indicated in dotted lines, in which they are inclined inwardly and rearwardly with respect to the direction of movement of the body and thereby present their surfaces in such manner as to increase the wind resistance. If desired, the plates 11 may be concavo-convex and when in position to reduce resistance present their convex surfaces to the wind currents and are turned to present their concave surfaces when a braking effect is desired. In addition to producing a braking effect in this way, the deflectors 11, when in their inwardly and rearwardly inclined positions, form a nozzle-like rearwardly converging passage acting to direct part of the wind currents at increased velocity against the front end of the vehicle so as to increase the braking effect. Furthermore, air would be sucked in from the sides into the space behind the deflectors 11 and forwardly of the front end of the vehicle due to the high velocity and lower pressure of the air currents passing between the deflectors, this also increasing the braking effect.

In Figs. 2 and 3 an additional pair of stationary deflecting plates 13 are mounted adjacent the front end of the vehicle, one at each side, in such positions as to be in the path of the wind currents B that have been deflected by the plates 12 to maintain these currents in their courses until they have passed the front end of the moving body, as disclosed in my application, Serial No. 86,714. A similar arrangement is shown in Fig. 4 but here the forwardly mounted deflecting plates 11 have mounted between them an additional pair of supplementary plates 14 as also disclosed in my earlier application No. 86,714 and the deflectors 13 are also movably mounted. It will be apparent that upon adjustment of the deflecting plates 11 to their braking positions, as represented in dotted lines in these figures, the wind currents B are caused to strike the front end of the moving body 10 and also the plates 13 so that the resistance to movement due to the wind is considerably increased.

In Figs. 5 and 6 the moving body 10 is assumed to be a vehicle which has a "streamlined" front end, and preferably a streamlined rear end also. In Fig. 5 the plates 11 are convex on their outer surfaces and concave on their inner surfaces to substantially conform with the contour of the front end 15 of the body. These plates are supported for rotation about axes 12 to the positions indicated in dotted lines. In this position they present their concave surfaces to the wind currents and thereby produce a braking action.

In Fig. 6 the exterior wall surfaces proper at the ends of the vehicle 10 are formed by concavo-convex deflecting plates 11 at either side of a similar plate 16 mounted on the axis of the vehicle with all of the plates arranged to turn to the dotted line positions for presenting their concave surfaces to the wind currents for the braking action.

It is to be understood that, as employed herein, the term "wind currents" includes both natural winds and those produced by the movement of a body. It is also to be understood that although the plates have been described as pivotally mounted they may be adjusted to their braking positions by sliding or other types of movement suitable to the form adopted.

What I claim is:

1. In combination with a moving body; a pair of laterally spaced plates mounted centrally in front of said body and inclined outwardly and rearwardly with respect to its longitudinal axis for deflecting wind currents encountered by said body outwardly away from its path of movement; a second pair of similarly inclined deflecting plates each mounted adjacent the front end of said body at one side thereof and disposed in the path of the wind currents deflected by said first plates to maintain said currents in their deflected courses; and pivotal supports for said first mentioned deflecting plates about which they may be turned to positions in which they are inclined inwardly with respect to said axis of said body for directing wind currents against the front end of said body to increase the wind resistance and produce a braking action.

2. In combination with a moving body, a pair of laterally spaced plates mounted centrally in front of said body and inclined outwardly and rearwardly with respect to its longitudinal axis for deflecting wind currents encountered by said body outwardly away from its path of movement; a second pair of similarly inclined deflecting plates each mounted adjacent the front end of said body at one side thereof and disposed in the path of the wind currents deflected by said first plates to maintain said currents in their deflected courses; and pivotal supports for said first mentioned deflecting plates about which they may be turned to positions in which they are inclined inwardly and rearwardly with respect to said axis of said body for directing wind currents against the inner sides of said second mentioned deflecting plates to increase the wind resistance and produce a braking action.

3. In combination with a moving body; a pair of laterally spaced plates mounted centrally in front of said body and inclined outwardly and rearwardly with respect to its longitudinal axis for deflecting wind currents encountered by said body outwardly away from its path of movement; a second pair of similarly inclined deflecting plates each mounted adjacent the front end of said body at one side thereof and disposed in the path of the wind currents deflected by said first plates to maintain said currents in their deflected courses; and pivotal supports for each of said deflecting plates about which they may be turned to positions in which they are inclined inwardly and rearwardly with respect to said axis of said body for increasing the wind resistance to provide a braking effect on said body.

4. In combination with a moving body; a pair of substantially vertically extending deflecting plates mounted in transversely spaced relation forwardly of the front end of said body and disposed symmetrically with respect to its longitudinal axis, said plates being inclined outwardly and rearwardly with respect to the longitudinal axis of said body for deflecting wind currents outwardly away from the path of movement of said body to reduce wind resistance to its movement; and pivotal supports for said plates about which they may be turned to rearwardly and inwardly inclined positions with respect to the longitudinal axis of said body to form a rearwardly converging passage for directing air currents at increased velocity against the front end of said body.

ANDRÉ HUET.